United States Patent
Kuroyanagi et al.

(10) Patent No.: US 10,516,312 B2
(45) Date of Patent: Dec. 24, 2019

(54) STATOR COIL, METHOD FOR MANUFACTURING STATOR, AND ROTATING ELECTRICAL MACHINE

(71) Applicants: AISIN AW CO., LTD., Anjo-shi, Aichi-ken (JP); HAYASHIKOGYOSYO CO., LTD., Nakatsugawa-shi, Gifu-ken (JP)

(72) Inventors: Toru Kuroyanagi, Okazaki (JP); Ko Kajita, Mizunami (JP); Takahiko Hobo, Nakatsugawa (JP)

(73) Assignees: AISIN AW CO., LTD., Anjo (JP); HAYASHIKOGYOSYO CO., LTD., Nakatsugawa-shi (JP)

( * ) Notice: Subject to any disclaimer, the term of this patent is extended or adjusted under 35 U.S.C. 154(b) by 118 days.

(21) Appl. No.: 15/742,254

(22) PCT Filed: Aug. 26, 2016

(86) PCT No.: PCT/JP2016/075043
§ 371 (c)(1),
(2) Date: Jan. 5, 2018

(87) PCT Pub. No.: WO2017/038706
PCT Pub. Date: Mar. 9, 2017

(65) Prior Publication Data
US 2018/0205277 A1    Jul. 19, 2018

(30) Foreign Application Priority Data
Aug. 28, 2015   (JP) .................................. 2015-168662

(51) Int. Cl.
*H02K 1/00*    (2006.01)
*H02K 3/28*    (2006.01)
(Continued)

(52) U.S. Cl.
CPC ................. *H02K 3/28* (2013.01); *H02K 1/16* (2013.01); *H02K 1/2753* (2013.01); *H02K 3/04* (2013.01);
(Continued)

(58) Field of Classification Search
CPC .. H02K 3/28; H02K 3/04; H02K 3/12; H02K 1/16; H02K 5/24; H02K 15/04; H02K 15/024; H02K 15/085
(Continued)

(56) References Cited

U.S. PATENT DOCUMENTS 4,520,287 A * 5/1985 Wang ....................... H02K 3/28
   29/596
4,619,040 A * 10/1986 Wang ....................... H02K 3/28
   174/DIG. 20
(Continued)

FOREIGN PATENT DOCUMENTS

DE     33 20 805 A1    12/1984
JP     H03-226251 A    10/1991
(Continued)

OTHER PUBLICATIONS

Nov. 15, 2016 Search Report issued in International Patent Application No. PCT/JP2016/075043.
Jun. 5, 2018 Search Report issued in European Patent Application No. 16841738.4.

*Primary Examiner* — Thanh Lam
(74) *Attorney, Agent, or Firm* — Oliff PLC (57) ABSTRACT

A stator coil that includes a first coil portion including a pair of first slot-housed portions respectively arranged on an outer side of a first slot of the stator core in a radial direction and on an outer side of a second slot of the stator core in the radial direction; a second coil portion including a pair of second slot-housed portions respectively arranged on an inner side of the first slot in the radial direction and on an
(Continued)

inner side of a third slot in the radial direction, the third slot being arranged across the first slot from the second slot in a circumferential direction; and a third coil portion including a pair of third slot-housed portions respectively arranged on an inner side and on an outer side in the radial direction.

13 Claims, 7 Drawing Sheets

(51) Int. Cl.
| | | |
|---|---|---|
| *H02K 3/04* | (2006.01) | |
| *H02K 15/04* | (2006.01) | |
| *H02K 1/16* | (2006.01) | |
| *H02K 1/27* | (2006.01) | |
| *H02K 3/12* | (2006.01) | |
| *H02K 5/24* | (2006.01) | |
| *H02K 15/02* | (2006.01) | |
| *H02K 15/085* | (2006.01) | |

(52) U.S. Cl.
CPC ............... *H02K 3/12* (2013.01); *H02K 5/24* (2013.01); *H02K 15/024* (2013.01); *H02K 15/04* (2013.01); *H02K 15/085* (2013.01)

(58) Field of Classification Search
USPC ........... 310/208, 179–180, 184–185; 29/596, 29/598
See application file for complete search history.

(56) References Cited

U.S. PATENT DOCUMENTS

| | | | | |
|---|---|---|---|---|
| 6,943,477 | B1* | 9/2005 | Nakamura | ............... H02K 3/28 310/180 |
| 2001/0038251 | A1* | 11/2001 | Nakamura | ............... H02K 3/28 310/180 |
| 2008/0093948 | A1* | 4/2008 | Naganawa | ........... H02K 15/045 310/203 |
| 2009/0267441 | A1 | 10/2009 | Hiramatsu et al. | |
| 2018/0198353 | A1* | 7/2018 | Kuroyanagi | ............. H02K 3/28 |
| 2018/0351427 | A1* | 12/2018 | Kuroyanagi | ......... H02K 15/066 |

FOREIGN PATENT DOCUMENTS

| | | |
|---|---|---|
| JP | 2009-195004 A | 8/2009 |
| JP | 2015-133889 A | 7/2015 |

* cited by examiner

STATOR COIL, METHOD FOR MANUFACTURING STATOR, AND ROTATING ELECTRICAL MACHINE

BACKGROUND

The present disclosure relates to a stator coil, a method for manufacturing a stator, and a rotating electrical machine.

Hitherto, there is known a rotating electrical machine including double-layer lap winding coils, in each of which one of a pair of slot-housed portions of the coil that are arranged in slots is arranged on an outer side of the slot in the radial direction and the other of the pair of slot-housed portions is arranged on an inner side of the slot in the radial direction. Such a rotating electrical machine and a stator are disclosed in, for example, Japanese Patent Application Publication No. 2009-195004 (JP 2009-195004 A).

In the rotating electrical machine described in Japanese Patent Application Publication No. 2009-195004 (JP 2009-195004 A), the slot-housed portion of one double-layer lap winding coil out of the two double-layer lap winding coils that are arranged adjacent to each other is arranged on the outer side of the slot in the radial direction, and the slot-housed portion of the other double-layer lap winding coil is arranged on the inner side of the same slot in the radial direction as that in which the slot-housed portion of the one double-layer lap winding coil is arranged. Furthermore, in the rotating electrical machine described in Japanese Patent Application Publication No. 2009-195004 (JP 2009-195004 A), the double-layer lap winding coils are arranged in all of the plurality of slots.

SUMMARY

In the rotating electrical machine described in Japanese Patent Application Publication No. 2009-195004 (JP 2009-195004 A), when the double-layer lap winding coils are arranged one by one in the slots, the slot-housed portion of the double-layer lap winding coil that is first arranged and the slot-housed portion of the final double-layer lap winding coil are arranged in the same slot. At this time, the slot-housed portion of the double-layer lap winding coil to be finally arranged is arranged deeper in the slot (on the opposite side to the opening of the slot (outer side of the slot in the radial direction)) than the slot-housed portion of the double-layer lap winding coil that is first arranged (slot-housed portion located on the inner side of the slot in the radial direction). Therefore, it is necessary that the slot-housed portion of the double-layer lap winding coil to be finally arranged be arranged in the slot in a state in which the slot-housed portion of the double-layer lap winding coil that is first arranged is temporarily removed from the slot and then the slot-housed portion of the double-layer lap winding coil that is first arranged and temporarily removed from the slot be arranged in the slot again. That is, when the slot-housed portion of the final double-layer lap winding coil is arranged in the slot, it is necessary to bypass the slot-housed portion of the double-layer lap winding coil that is first arranged. As a result, a problem arises in terms of difficulty in achieving mechanization (automation) of an operation of arranging the coil in the slots.

An exemplary aspect of the present disclosure provides a stator coil, a method for manufacturing a stator, and a rotating electrical machine which facilitate a mechanized (automated) operation of arranging coils in slots.

A stator coil according to a first aspect of the present disclosure is a coil arranged in a stator core. The stator coil includes a first coil portion including a pair of first slot-housed portions respectively arranged on an outer side of a first slot of the stator core in a radial direction and on an outer side of a second slot of the stator core in the radial direction, a second coil portion including a pair of second slot-housed portions respectively arranged on an inner side of the first slot in the radial direction and on an inner side of a third slot in the radial direction, the third slot being arranged across the first slot from the second slot in a circumferential direction, and a third coil portion including a pair of third slot-housed portions respectively arranged on an inner side and on an outer side in the radial direction, one of the third slot-housed portions being arranged on either of an inner side of the second slot in the radial direction and an outer side of the third slot in the radial direction.

In the stator coil according to the first aspect of the present disclosure, with the structure described above, for example, when the slots are open to a radially inner side of the stator core, the first coil portion is first arranged in the stator core, the third coil portion is arranged in the stator core, and then the second coil portion is finally arranged in the stator core. As a result, the second slot-housed portions of the second coil portion to be finally arranged can be arranged in the slots on a shallow side (slot opening side) of the first slot-housed portion of the first coil portion that is first arranged on the outer side in the radial direction and on a shallow side (slot opening side) of the third slot-housed portion of the third coil portion that is arranged on the outer side in the radial direction. Thus, the second slot-housed portions of the second coil portion can be arranged in the slots without bypassing (temporarily removing) the first slot-housed portion of the first coil portion that is first arranged in the stator core. Accordingly, the operation of arranging the coil in the slots can be mechanized (automated) easily. When the slots are open to a radially outer side of the stator core, similar effects can be attained by first arranging the second coil portion in the stator core and finally arranging the first coil portion in the stator core.

A method for manufacturing a stator according to a second aspect of the present disclosure includes arranging, in a stator core, one of a first coil portion including a pair of first slot-housed portions to be respectively arranged on an outer side of a first slot of the stator core in a radial direction and on an outer side of a second slot of the stator core in the radial direction and a second coil portion including a pair of second slot-housed portions to be respectively arranged on an inner side of the first slot in the radial direction and on an inner side of a third slot in the radial direction, the third slot being arranged across the first slot from the second slot in a circumferential direction, arranging, in the stator core, a third coil portion including a pair of third slot-housed portions to be respectively arranged on an inner side and on an outer side in the radial direction, one of the third slot-housed portions being arranged on either of an inner side of the second slot in the radial direction and an outer side of the third slot in the radial direction, and arranging, in the stator core, the other of the first coil portion and the second coil portion.

In the method for manufacturing a stator according to the second aspect of the present disclosure, with the structure described above, for example, when the slots are open to a radially inner side of the stator core, the first coil portion is first arranged in the stator core, the third coil portion is arranged in the stator core, and then the second coil portion is finally arranged in the stator core. As a result, the second slot-housed portions of the second coil portion to be finally arranged can be arranged in the slots on a shallow side (slot opening side) of the first slot-housed portion of the first coil portion that is first arranged on the outer side in the radial direction and on a shallow side (slot opening side) of the third slot-housed portion of the third coil portion that is arranged on the outer side in the radial direction. Thus, the second slot-housed portions of the second coil portion can be arranged in the slots without bypassing (temporarily removing) the first slot-housed portion of the first coil portion that is first arranged in the stator core. Accordingly, it is possible to provide a method for manufacturing a stator in which the operation of arranging the coil in the slots can be mechanized (automated) easily.

A rotating electrical machine according to a third aspect of the present disclosure includes a rotor core provided with a permanent magnet, a stator core arranged so as to face the rotor core in a radial direction, and a coil arranged in the stator core. The coil includes a first coil portion including a pair of first slot-housed portions respectively arranged on an outer side of a first slot of the stator core in the radial direction and on an outer side of a second slot of the stator core in the radial direction, a second coil portion including a pair of second slot-housed portions respectively arranged on an inner side of the first slot in the radial direction and on an inner side of a third slot in the radial direction, the third slot being arranged across the first slot from the second slot in a circumferential direction, and a third coil portion including a pair of third slot-housed portions respectively arranged on an inner side and on an outer side in the radial direction, one of the third slot-housed portions being arranged on either of an inner side of the second slot in the radial direction and an outer side of the third slot in the radial direction.

In the rotating electrical machine according to the third aspect of the present disclosure, with the structure described above, for example, when the slots are open to a radially inner side of the stator core, the first coil portion is first arranged in the stator core, the third coil portion is arranged in the stator core, and then the second coil portion is finally arranged in the stator core. As a result, the second slot-housed portions of the second coil portion to be finally arranged can be arranged in the slots on a shallow side (slot opening side) of the first slot-housed portion of the first coil portion that is first arranged on the outer side in the radial direction and on a shallow side (slot opening side) of the third slot-housed portion of the third coil portion that is arranged on the outer side in the radial direction. Thus, the second slot-housed portions of the second coil portion can be arranged in the slots without bypassing (temporarily removing) the first slot-housed portion of the first coil portion that is first arranged in the stator core. Accordingly, it is possible to provide a rotating electrical machine in which the operation of arranging the coil in the slots can be mechanized (automated) easily.

According to the present disclosure, the operation of arranging the coil in the slots can be mechanized (automated) easily as described above.

DETAILED DESCRIPTION OF EMBODIMENTS

Embodiments of the present disclosure are described below with reference to the drawings.

First Embodiment (Structure of Rotating Electrical Machine)

Figure 1:
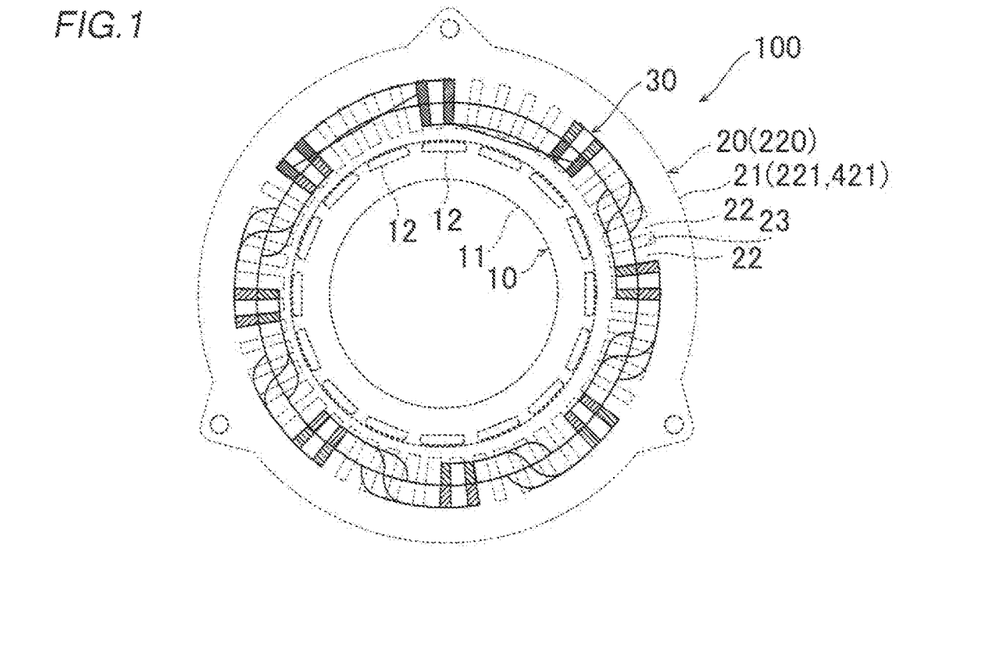
FIG. 1 is a plan view of a rotating electrical machine according to a first embodiment of the present disclosure.
Figure 2:
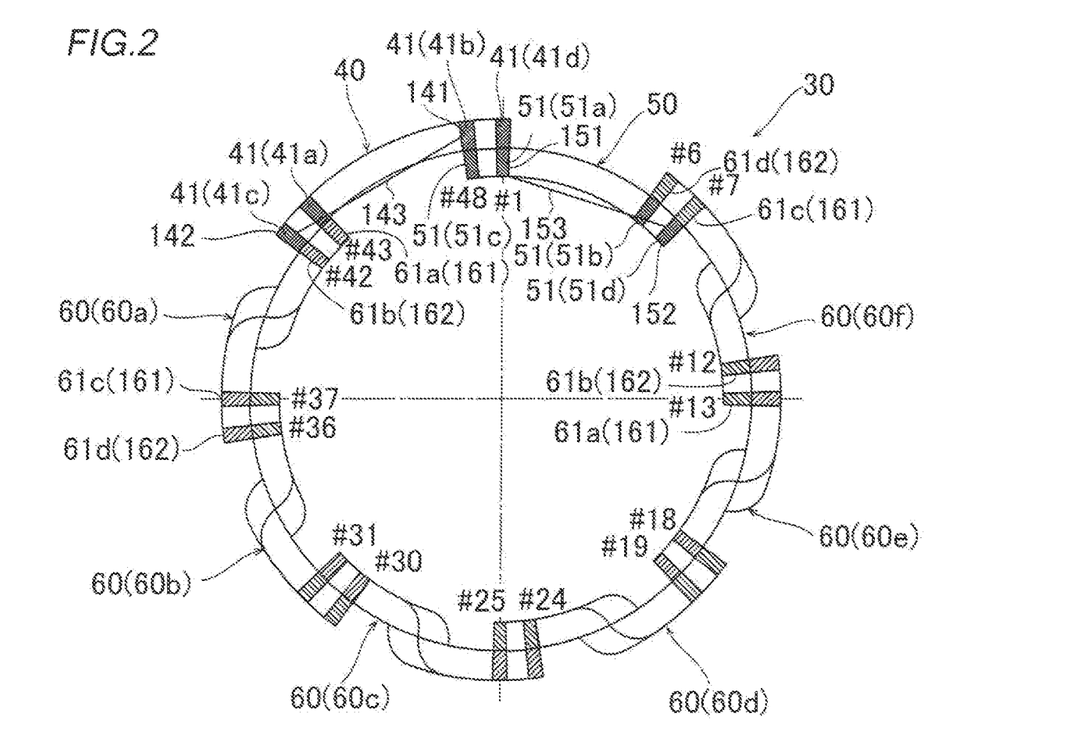
FIG. 2 is a view illustrating a coil of the rotating electrical machine according to the first embodiment of the present disclosure.

The structure of a rotating electrical machine 100 according to a first embodiment is described with reference to FIG. 1 to FIG. 4. FIG. 1 and FIG. 2 illustrate only a coil 30 of one phase out of coils 30 of three phases.

As illustrated in FIG. 1, the rotating electrical machine 100 includes a rotor 10. A rotor core 11 of the rotor 10 is provided with a plurality of permanent magnets 12. The plurality of permanent magnets 12 are arranged substantially equiangularly along a circumferential direction.

Furthermore, the rotating electrical machine 100 includes a stator 20 (stator core 21) arranged so as to face the outer peripheral surface of the rotor core 11 in a radial direction. The stator core 21 includes a plurality of teeth 22 and a plurality of (for example, 48) slots 23 each located between adjacent teeth 22. The slots 23 are open to a center side of the stator core 21.

The coil 30 is arranged in the slots 23 of the stator core 21. The coil 30 is, for example, structured by conductor wires. Note that the coil 30 is an example of a "stator coil." The conductor wire may be any one of a rectangular wire and a round wire.

(Structure of Coil)

Next, the structure of the coil 30 is described with reference to FIG. 2. FIG. 2 illustrates only the coil 30 of one phase that is arranged in the 48 (slot numbers #1 to #48) slots 23.

In the first embodiment, the coil 30 includes a first coil portion 40, a second coil portion 50, and third coil portions 60 (60a to 60f). The first coil portion 40 is formed of a single-layer lap winding coil including a pair of first slot-housed portions 41 respectively arranged on outer sides (deep sides) of the slots 23 with slot numbers #1 and #48 in the radial direction and on outer sides (deep sides) of the slots 23 with slot numbers #42 and #43 in the radial direction. Note that, in the specification of the present application, the single-layer lap winding coil herein means a coil having a pair of slot-housed portions respectively arranged only on outer sides of the slots 23 in the radial direction or only on inner sides of the slots 23 in the radial direction. Furthermore, each of the slots 23 with slot numbers #1 and #48 is an example of a "first slot." Furthermore, each of the slots 23 with slot numbers #42 and #43 is an example of a "second slot." Note that each of the coils 30 of the three respective phases (U phase, V phase, and W phase) includes the first coil portion 40, the second coil portion 50, and the third coil portions 60 as described above. Furthermore, each of the third coil portions 60a and 60f is an example of a "third coil portion."

The second coil portion 50 is formed of a single-layer lap winding coil including a pair of second slot-housed portions 51 respectively arranged on inner sides (shallow sides) of the slots 23 with slot numbers #1 and #48 in the radial direction and on inner sides (shallow sides) of the slots 23 with slot numbers #6 and #7 in the radial direction that are arranged across slot numbers #1 and #48 from slot numbers #42 and #43 in the circumferential direction. Note that each of the slots 23 with slot numbers #6 and #7 is an example of a "third slot."

Each of the third coil portions 60 (third coil portions 60a to 60f) is formed of a double-layer lap winding coil, and a plurality of (six in the first embodiment) third coil portions 60 are provided. Note that, in the specification of the present application, the double-layer lap winding coil herein means a coil having a pair of slot-housed portions respectively arranged on an outer side of the slot 23 in the radial direction and on an inner side of the slot 23 in the radial direction. The third coil portion 60a includes a third slot-housed portion 61 arranged on inner sides of the slots 23 with slot numbers #42 and #43 in the radial direction. Furthermore, the third coil portion 60f includes a third slot-housed portion 61 arranged on outer sides of the slots 23 with slot numbers #6 and #7 in the radial direction. In the third coil portions 60 (third coil portions 60a to 60f), a third slot-housed portion 61 of one of adjacent third coil portions 60 is arranged on an outer side of the same slot 23 in the radial direction, and a third slot-housed portion 61 of the other of the adjacent third coil portions 60 is arranged on an inner side of the same slot 23 in the radial direction.

In the first embodiment, the coil portions of the coil 30 other than the first coil portion 40 formed of the single-layer lap winding coil and the second coil portion 50 formed of the single-layer lap winding coil are structured by the third coil portions 60 (third coil portions 60a to 60f) including the third coil portions 60a and 60f, each of which includes the pair of slot-housed portions respectively arranged on the inner side and on the outer side in the radial direction (that is, formed of the double-layer lap winding coil).

Figure 3:
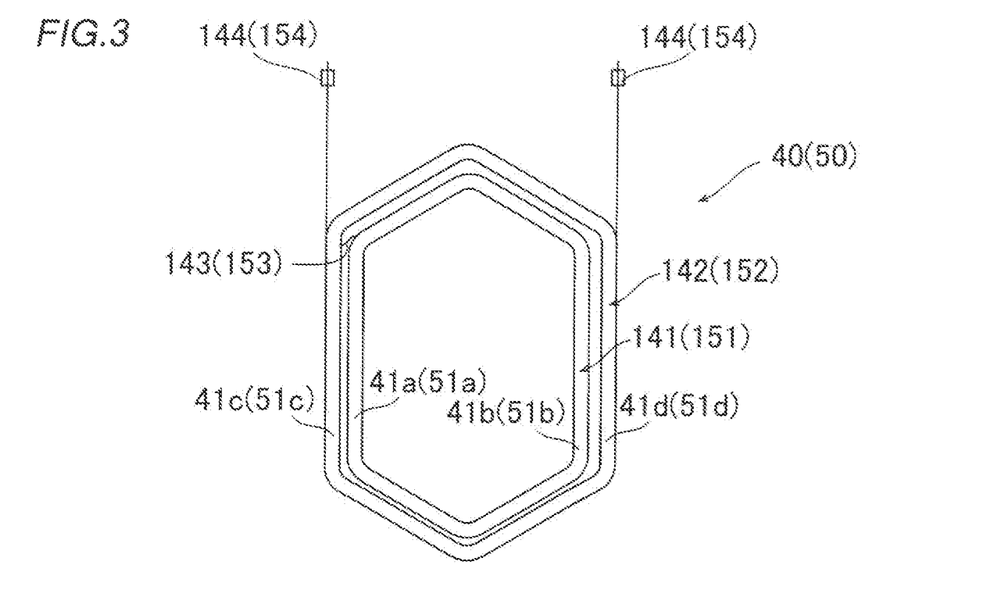
FIG. 3 is a view illustrating a first coil portion (second coil portion) of the rotating electrical machine according to the first embodiment of the present disclosure.

As illustrated in FIG. 3, the first coil portion 40 includes a first inner coil part 141 wound on a concentrically inner side, and a first outer coil part 142 wound on an outer side of the first inner coil part 141 (concentrically outer side). Furthermore, the second coil portion 50 includes a second inner coil part 151 wound on a concentrically inner side, and a second outer coil part 152 wound on an outer side of the second inner coil part 151 (concentrically outer side). Specifically, the first inner coil part 141 and the first outer coil part 142 of the first coil portion 40 are each formed of a conductor wire (rectangular wire or round wire) that is wound a plurality of times, and are connected together in series by an inter-coil connecting wire 143. Furthermore, the second inner coil part 151 and the second outer coil part 152 are connected together in series by an inter-coil connecting wire 153.

That is, as illustrated in FIG. 2, first slot-housed portions 41a and 41b of the first inner coil part 141 are respectively arranged on the outer sides of the slots 23 with slot numbers #43 and #48 in the radial direction. Furthermore, first slot-housed portions 41c and 41d of the first outer coil part 142 are respectively arranged on the outer sides of the slots 23 with slot numbers #42 and #1 in the radial direction. Second slot-housed portions 51a and 51b of the second inner coil part 151 are respectively arranged on the inner sides of the slots 23 with slot numbers #1 and #6 in the radial direction. Furthermore, second slot-housed portions 51c and 51d of the second outer coil part 152 are respectively arranged on the inner sides of the slots 23 with slot numbers #48 and #7 in the radial direction.

In the first embodiment, the first inner coil part 141 and the first outer coil part 142 are routed (connected) together by the inter-coil connecting wire 143, and the second inner coil part 151 and the second outer coil part 152 are routed together by the inter-coil connecting wire 153.

Figure 4:
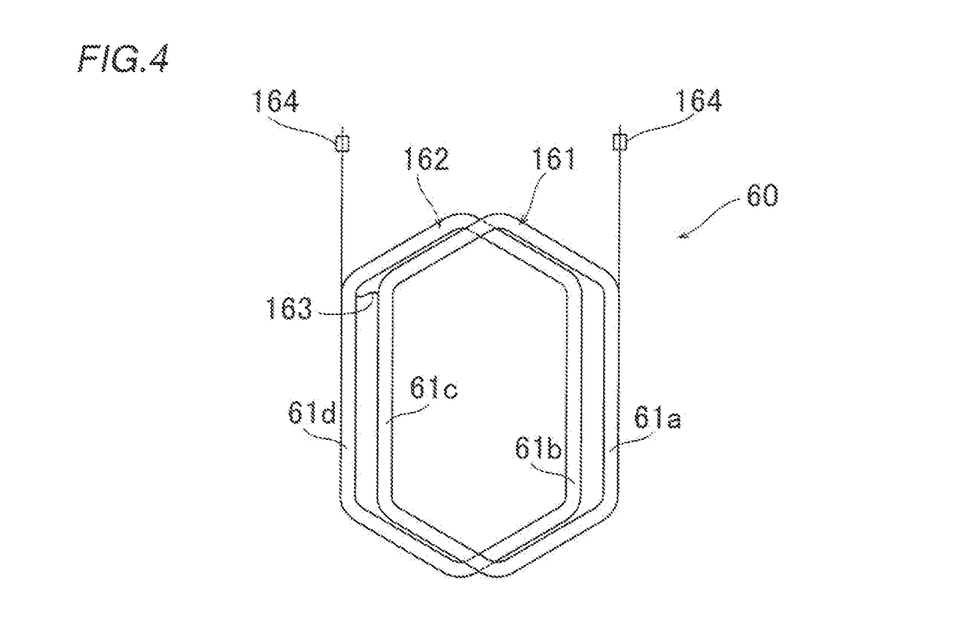
FIG. 4 is a view illustrating a third coil portion of the rotating electrical machine according to the first embodiment of the present disclosure.

As illustrated in FIG. 4, the third coil portion 60 includes a third coil part 161 arranged on one side in the circumferential direction, and a third coil part 162 arranged on the other side in the circumferential direction. The third coil part 161 and the third coil part 162 are each formed of a conductor wire (rectangular wire or round wire) that is wound a plurality of times, and are connected together in series by an inter-coil connecting wire 163.

For example, as illustrated in FIG. 2, the third coil part 161 of the third coil portion 60a is wound in the slots 23 with slot numbers #37 and #43. Furthermore, the third coil part 162 of the third coil portion 60a is wound in the slots 23 with slot numbers #36 and #42. The third coil part 161 of the third coil portion 60f is wound in the slots 23 with slot numbers #7 and #13. Furthermore, the third coil part 162 of the third coil portion 60f is wound in the slots 23 with slot numbers #6 and #12.

Third slot-housed portions 61a and 61b of the third coil portion 60a are respectively arranged on the inner sides of the slots 23 with slot numbers #43 and #42 in the radial direction. Furthermore, third slot-housed portions 61c and 61d of the third coil portion 60a are respectively arranged on outer sides of the slots 23 with slot numbers #37 and #36 in the radial direction.

Third slot-housed portions 61a and 61b of the third coil portion 60f are respectively arranged on inner sides of the slots 23 with slot numbers #13 and #12 in the radial direction. Furthermore, third slot-housed portions 61c and 61d of the third coil portion 60f are respectively arranged on the outer sides of the slots 23 with slot numbers #7 and #6 in the radial direction.

In the first embodiment, as illustrated in FIG. 1, the coil 30 including the first coil portion 40, the second coil portion 50, and the third coil portions 60 is structured so as to be attached to the slots 23 from the center side toward a radially outer side of the stator core 21. End wires 144 of the first coil portion 40 (see FIG. 3), end wires 154 of the second coil portion 50, and end wires 164 of the third coil portions 60

(see FIG. 4) are structured so as to be routed together by connecting wires (not illustrated) after the first coil portion 40, the second coil portion 50, and the third coil portions 60 are arranged in the slots 23. Thus, the first coil portion 40, the second coil portion 50, and the third coil portions 60 are connected together in series.

(Effects of Structure of First Embodiment)

In the first embodiment, the following effects can be attained.

In the first embodiment, as illustrated in FIG. 2, the coil 30 includes the first coil portion 40 formed of the single-layer lap winding coil including the pair of first slot-housed portions 41 respectively arranged on the outer sides of the slots 23 with slot numbers #1 and #48 in the radial direction and on the outer sides of the slots 23 with slot numbers #42 and #43 in the radial direction, the second coil portion 50 formed of the single-layer lap winding coil including the pair of second slot-housed portions 51 respectively arranged on the inner sides of the slots 23 with slot numbers #1 and #48 in the radial direction and on the inner sides of the slots 23 with slot numbers #6 and #7 in the radial direction that are arranged across the slots 23 with slot numbers #1 and #48 from the slots 23 with slot numbers #42 and #43 in the circumferential direction, the third coil portion 60a including one third slot-housed portion 61 arranged on the inner sides of the slots 23 with slot numbers #42 and #43 in the radial direction, and the third coil portion 60f formed of the double-layer lap winding coil including the other third slot-housed portion 61 arranged on the outer sides of the slots 23 with slot numbers #6 and #7 in the radial direction. Therefore, when the slots 23 are open to the radially inner side of the stator core 21, the first coil portion 40 formed of the single-layer lap winding coil is first arranged in the stator core 21, the third coil portions 60 formed of the double-layer lap winding coils are arranged in the stator core 21, and then the second coil portion 50 is finally arranged in the stator core 21. As a result, the second slot-housed portions 51 of the second coil portion 50 to be finally arranged can be arranged in the slots 23 on the shallow side (slot opening side) with respect to the first slot-housed portion 41 of the first coil portion 40 that is first arranged on the outer side in the radial direction and on the shallow side (slot opening side) with respect to the third slot-housed portion 61 of the third coil portion 60f that is arranged on the outer side in the radial direction. Thus, the second slot-housed portions 51 of the second coil portion 50 can be arranged in the slots without bypassing (temporarily removing) the first slot-housed portion 41 of the first coil portion 40 that is first arranged in the stator core 21. Accordingly, an operation of arranging the coil 30 in the slots 23 can be mechanized (automated) easily.

In the first embodiment, as illustrated in FIG. 2, the coil portions of the coil 30 other than the first coil portion 40 formed of the single-layer lap winding coil and the second coil portion 50 formed of the single-layer lap winding coil are structured by the third coil portions 60 including the third coil portions 60a and 60f, each of which includes the pair of slot-housed portions respectively arranged on the inner side and on the outer side in the radial direction (that is, formed of the double-layer lap winding coil). In the double-layer lap winding coil, one slot-housed portion is arranged on the inner side of the slot in the radial direction, and the other slot-housed portion is arranged on the outer side of the slot in the radial direction. Therefore, the balance of flux linkage is improved as compared to the single-layer lap winding coil. That is, noise and vibration can be reduced. Furthermore, in the double-layer lap winding coil, downsizing and insulation performance of the coil are generally improved as compared to the single-layer lap winding coil. Therefore, the portions (coil portions) other than the first coil portion 40 and the second coil portion 50 are structured by the third coil portions 60 formed of the double-layer lap winding coils. Accordingly, the arrangement of the coil 30 in the slots 23 can be mechanized (automated) easily while keeping the features of the double-layer lap winding coil such as reduction in noise and vibration, downsizing, and high insulation performance to some extent.

In the first embodiment, as illustrated in FIG. 2, the plurality of third coil portions 60 are provided. One third slot-housed portion 61 of one third coil portion 60a out of the plurality of third coil portions 60 is arranged on the inner sides of the slots 23 with slot numbers #42 and #43 in the radial direction, and the other third slot-housed portion 61 of another third coil portion 60f out of the plurality of third coil portions 60 is arranged on the outer sides of the slots 23 with slot numbers #6 and #7 in the radial direction. Accordingly, the features of the double-layer lap winding coil such as reduction in noise and vibration, downsizing, and high insulation performance can be kept effectively owing to the structure in which the plurality of third coil portions 60 formed of the double-layer lap winding coils are provided.

In the first embodiment, as illustrated in FIG. 2, the first inner coil part 141 and the first outer coil part 142 are routed together, and the second inner coil part 151 and the second outer coil part 152 are routed together. Accordingly, the rotating electrical machine 100 can be structured without changing the routing while keeping the states of the first coil portion 40 and the second coil portion 50 before the first coil portion 40 and the second coil portion 50 are arranged in the slots 23.

In the first embodiment, as illustrated in FIG. 3 and FIG. 4, the end wires 144 of the first coil portion 40, the end wires 154 of the second coil portion 50, and the end wires 164 of the third coil portions 60 are routed together after the first coil portion 40, the second coil portion 50, and the third coil portions 60 are arranged in the slots 23. Accordingly, the first coil portion 40, the second coil portion 50, and the third coil portions 60 can easily be arranged in the slots 23 unlike a case where the first coil portion 40, the second coil portion 50, and the third coil portions 60 are arranged in the slots 23 while being routed together by connecting wires (not illustrated).

In the first embodiment, as illustrated in FIG. 1, the slots 23 are open to the center side of the stator core 21, and the coil 30 including the first coil portion 40, the second coil portion 50, and the third coil portions 60 is structured so as to be attached to the slots 23 from the center side toward the radially outer side of the stator core 21. Accordingly, the arrangement of the coil 30 in the slots 23 can be mechanized (automated) easily in the rotating electrical machine 100 in which the slots 23 are open to the center side of the stator core 21.

(Method for Manufacturing Stator)

Figure 5:
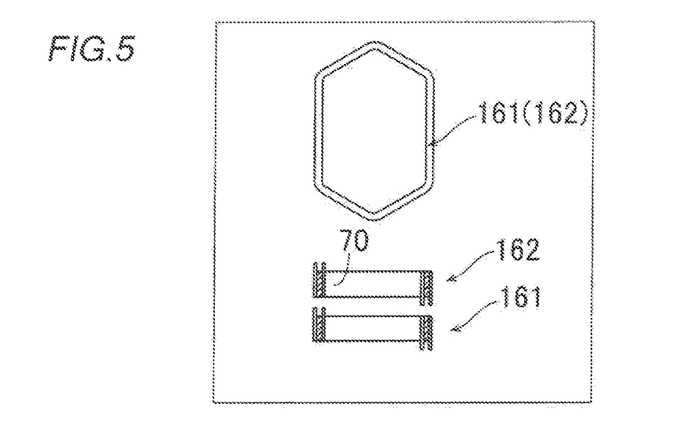
FIG. 5 is a view (1) for describing a method for manufacturing the third coil portion of the rotating electrical machine according to the first embodiment of the present disclosure.
Figure 6:
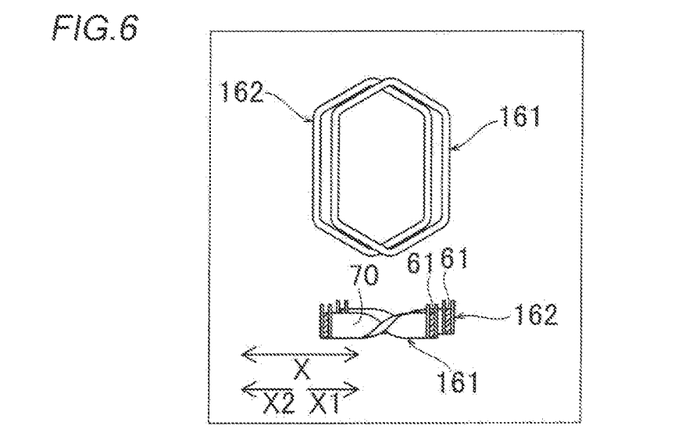
FIG. 6 is a view (2) for describing the method for manufacturing the third coil portion of the rotating electrical machine according to the first embodiment of the present disclosure.
Figure 7:
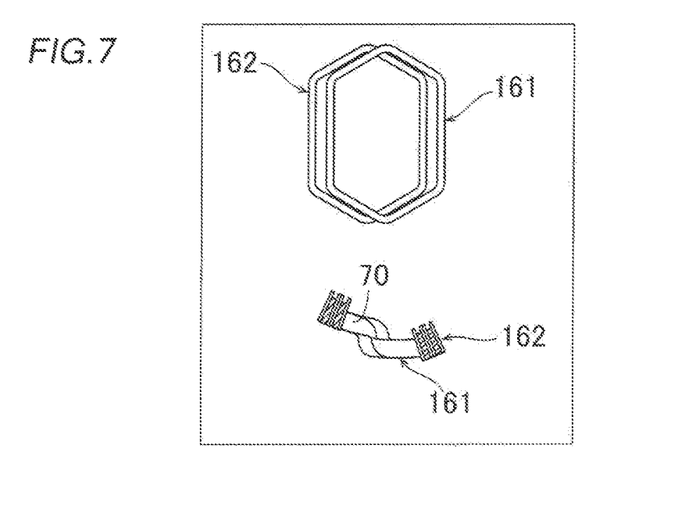
FIG. 7 is a view (3) for describing the method for manufacturing the third coil portion of the rotating electrical machine according to the first embodiment of the present disclosure.

Next, a method for manufacturing the stator 20 of the rotating electrical machine 100 is described with reference to FIG. 2, FIG. 3, and FIG. 5 to FIG. 8. In FIG. 5 to FIG. 7, a front view of the coil is illustrated at an upper stage, and a sectional view of the coil (sectional view that is seen in a rotational axis direction) is illustrated at a lower stage.

As illustrated in FIG. 5, the third coil part 161 and the third coil part 162 for structuring the third coil portion 60 formed of the double-layer lap winding coil are prepared. The third coil portion 60 (the same applies to the first coil portion 40 and the second coil portion 50 described later) is covered with insulating paper 70.

Next, as illustrated in FIG. 6, the third coil part 161 and the third coil part 162 are caused to overlap each other so that the third coil part 161 is arranged on one side (X1 direction side) and the third coil part 162 is arranged on the other side (X2 direction side). At this time, the third coil part 161 and the third coil part 162 are deformed in a twisted manner so that the third slot-housed portion 61 of the third coil part 161 and the third slot-housed portion 61 of the third coil part 162 overlap each other in an X direction.

Next, as illustrated in FIG. 7, the third coil portion 60 in a state in which the third coil part 161 and the third coil part 162 are caused to overlap each other is deformed into an arc shape as seen in the rotational axis direction of the rotating electrical machine 100 so that the third coil portion 60 can be arranged in the slots 23.

Similarly, as illustrated in FIG. 3, the first inner coil part 141 and the first outer coil part 142 for structuring the first coil portion 40 formed of the single-layer lap winding coil are prepared. In a state in which the first outer coil part 142 is arranged on the radially outer side of the first inner coil part 141, the first coil portion 40 is deformed into an arc shape as seen in the rotational axis direction of the rotating electrical machine 100 so that the first coil portion 40 can be arranged in the slots 23. Similarly, the second coil portion 50 is formed.

Figure 8:
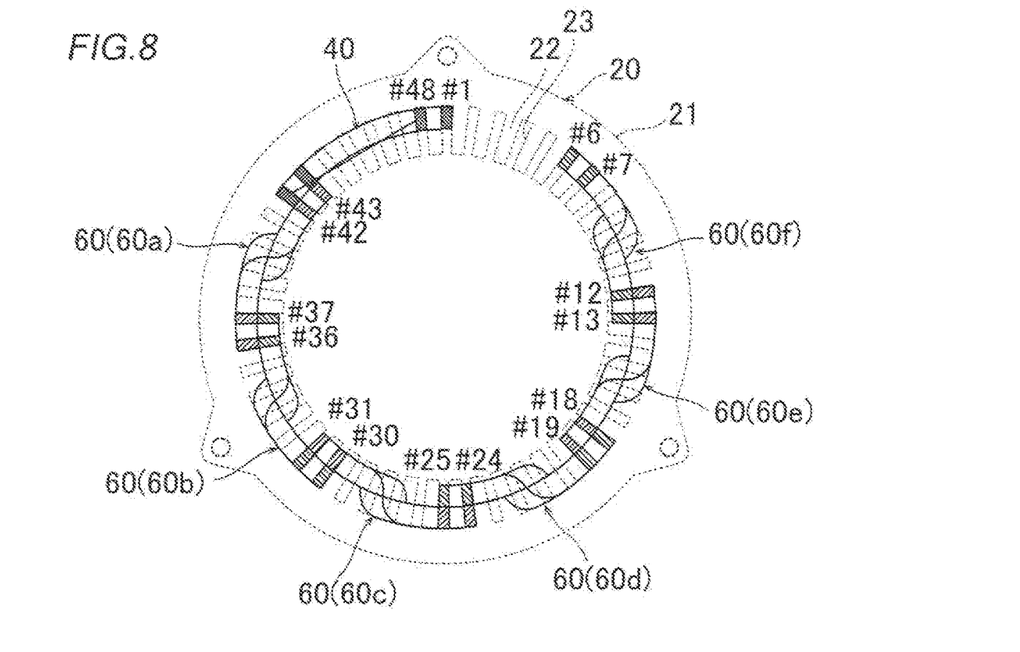
FIG. 8 is a view for describing a method for manufacturing the rotating electrical machine according to the first embodiment of the present disclosure.

In the first embodiment, as illustrated in FIG. 8, the first coil portion 40 is arranged in the slots 23 of the stator core 21 from the center side toward the radially outer side of the stator core 21 so that the pair of first slot-housed portions 41 are respectively arranged on the outer sides of the slots 23 with slot numbers #1 and #48 in the radial direction and on the outer sides of the slots 23 with slot numbers #42 and #43 in the radial direction.

Next, the third coil portion 60a is arranged in the slots 23 of the stator core 21 from the center side toward the radially outer side of the stator core 21 so that the pair of third slot-housed portions 61 are respectively arranged on the outer sides of the slots 23 with slot numbers #36 and #37 in the radial direction and on the inner sides of the slots 23 with slot numbers #42 and #43 in the radial direction.

Similarly, the third coil portions 60b to 60e are arranged in this order one by one in the slots 23 of the stator core 21 from the center side toward the radially outer side of the stator core 21. Furthermore, the third coil portion 60f is arranged in the slots 23 of the stator core 21 from the center side toward the radially outer side of the stator core 21 so that the pair of third slot-housed portions 61 are respectively arranged on the outer sides of the slots 23 with slot numbers #6 and #7 in the radial direction and on the inner sides of the slots 23 with slot numbers #12 and #13 in the radial direction.

Next, as illustrated in FIG. 2, the second coil portion 50 is arranged in the slots 23 of the stator core 21 from the center side toward the radially outer side of the stator core 21 so that the pair of second slot-housed portions 51 are respectively arranged on the inner sides of the slots 23 with slot numbers #1 and #48 in the radial direction and on the inner sides of the slots 23 with slot numbers #6 and #7 in the radial direction. At this time, the inner sides of the slots 23 with slot numbers #1 and #48 in the radial direction and the inner sides of the slots 23 with slot numbers #6 and #7 in the radial direction are unoccupied (see FIG. 8). Therefore, the second coil portion 50 is arranged in the slots 23 of the stator core 21 without temporarily removing (bypassing) the first slot-housed portion 41 of the first coil portion 40 and the third slot-housed portion 61 of the third coil portion 60 out of the slots 23.

As described above, in the first embodiment, the first coil portion 40, the second coil portion 50, and the third coil portions 60 (third coil portions 60a to 60f) are arranged one by one in the stator core 21.

Finally, the first coil portion 40, the second coil portion 50, and the third coil portions 60 are routed together by connecting wires (not illustrated) after the first coil portion 40, the second coil portion 50, and the third coil portions 60 are arranged in the slots 23.

(Effects of Manufacturing Method of First Embodiment)

In the first embodiment, the following effects can be attained.

In the first embodiment, as illustrated in FIG. 8, the manufacturing method includes a step of arranging, in the stator core 21, the first coil portion 40 formed of the single-layer lap winding coil including the pair of first slot-housed portions 41 to be respectively arranged on the outer sides of the slots 23 with slot numbers #1 and #48 in the radial direction and on the outer sides of the slots 23 with slot numbers #42 and #43 in the radial direction, a step of arranging, in the stator core 21, the third coil portion 60a including one third slot-housed portion 61 to be arranged on the inner sides of the slots 23 with slot numbers #42 and #43 in the radial direction, and the third coil portion 60f formed of the double-layer lap winding coil including the other third slot-housed portion 61 to be arranged on the outer sides of the slots 23 with slot numbers #6 and #7 in the radial direction, and a step of arranging, in the stator core 21, the second coil portion 50 formed of the single-layer lap winding coil including the pair of second slot-housed portions 51 to be respectively arranged on the inner sides of the slots 23 with slot numbers #1 and #48 in the radial direction and on the inner sides of the slots 23 with slot numbers #6 and #7 in the radial direction that are arranged across the slots 23 with slot numbers #1 and #48 from the slots 23 with slot numbers #42 and #43. Therefore, the second slot-housed portions 51 of the second coil portion 50 can be arranged in the slots 23 without bypassing (temporarily removing) the first slot-housed portion 41 of the first coil portion 40 that is first arranged in the stator core 21. Accordingly, the operation of arranging the coil 30 in the slots 23 can be mechanized (automated) easily.

Furthermore, in the first embodiment, the first coil portion 40, the second coil portion 50, and the third coil portions 60 are arranged one by one in the stator core 21 as described above. Accordingly, the first coil portion 40, the second coil portion 50, and the third coil portions 60 can easily be arranged in the stator core 21 without causing interference between the respective coil portions.

Second Embodiment (Structure of Rotating Electrical Machine)

The structure of a rotating electrical machine 200 according to a second embodiment is described with reference to FIG. 9. In the rotating electrical machine 200 according to the second embodiment, one of an inner coil part and an outer coil part of a first coil portion 240 and the other of an inner coil part and an outer coil part of a second coil portion 250 are routed together unlike the first embodiment described above in which the inner coil part and the outer coil part of the first coil portion 40 (second coil portion 50) itself are routed together.

Figure 9:
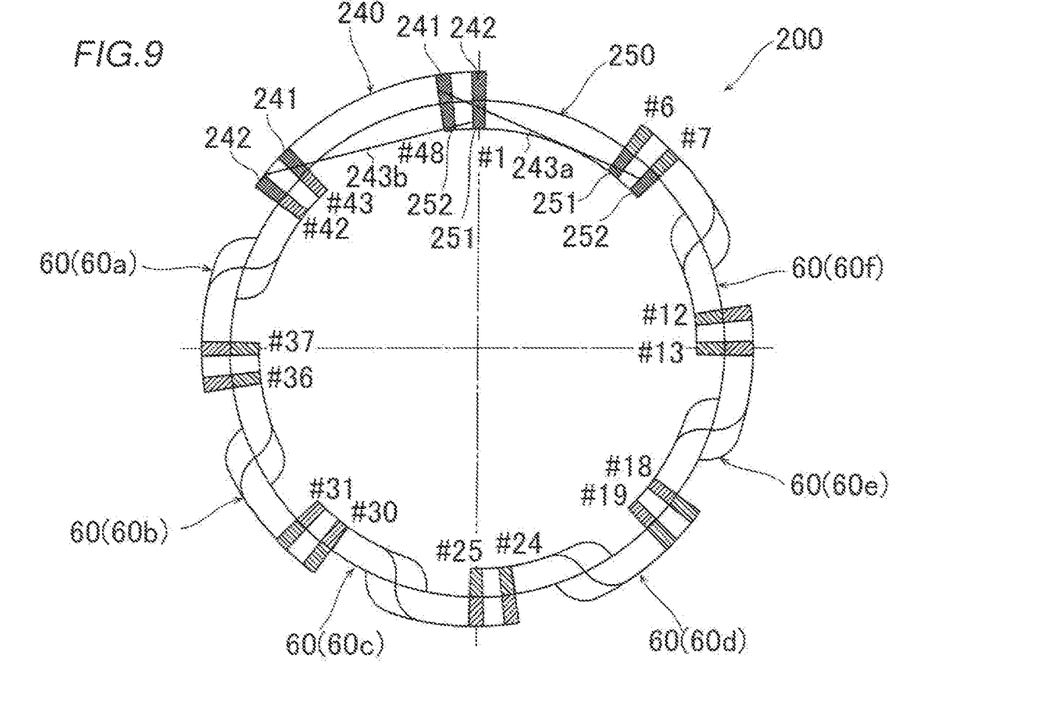
FIG. 9 is a plan view of a rotating electrical machine according to a second embodiment of the present disclosure.

As illustrated in FIG. 9, in the rotating electrical machine 200, the first coil portion 240 includes a first inner coil part 241 wound on an inner side, and a first outer coil part 242 wound on an outer side of the first inner coil part 241. Furthermore, the second coil portion 250 includes a second inner coil part 251 wound on an inner side, and a second outer coil part 252 wound on an outer side of the second inner coil part 251. In the second embodiment, the first inner coil part 241 and the second outer coil part 252 are routed together by an inter-coil connecting wire 243a, and the first outer coil part 242 and the second inner coil part 251 are routed together by an inter-coil connecting wire 243b.

The other structures of the second embodiment are similar to those of the first embodiment described above.

(Effects of Structure of Second Embodiment)

In the second embodiment, the following effects can be attained.

In the second embodiment, as illustrated in FIG. 9, the first inner coil part 241 and the second outer coil part 252 are routed together, and the first outer coil part 242 and the second inner coil part 251 are routed together. In the single-layer lap winding coil, the slot-housed portions are arranged only on the outer sides or the inner sides of the slots in the radial direction, and therefore the balance of flux linkage is poorer than that of the double-layer lap winding coil. In view of this, the first inner coil part 241 and the second outer coil part 252 are routed together, and the first outer coil part 242 and the second inner coil part 251 are routed together. Accordingly, the balance of flux linkage can be improved also in the first coil portion 240 and the second coil portion 50 that are the single-layer lap winding coils.

(Method for Manufacturing Stator)

Next, a method for manufacturing a stator 220 (see FIG. 1) of the rotating electrical machine 200 is described with reference to FIG. 9.

Methods for preparing the first coil portion 240, the second coil portion 250, and the third coil portions 60 and arranging the first coil portion 240, the second coil portion 250, and the third coil portions 60 in a stator core 221 (see FIG. 1) are similar to those of the first embodiment described above.

In the second embodiment, as illustrated in FIG. 9, after the first coil portion 240, the second coil portion 250, and the third coil portions 60 are arranged in the stator core 221, the first inner coil part 241 and the second outer coil part 252 are routed together, and the first outer coil part 242 and the second inner coil part 251 are routed together. That is, the routing between the first coil portion 240 and the second coil portion 250 is changed from the state of the first embodiment in which the inner coil part and the outer coil part of each of the first coil portion 40 and the second coil portion 50 themselves are routed together (see FIG. 2). In other words, the connection using the inter-coil connecting wires 243a and 243b is changed.

(Effects of Manufacturing Method of Second Embodiment)

In the second embodiment, the following effects can be attained.

In the second embodiment, as illustrated in FIG. 9, after the first coil portion 240, the second coil portion 250, and the third coil portions 60 are arranged in the stator core 221, the first inner coil part 241 and the second outer coil part 252 are routed together, and the first outer coil part 242 and the second inner coil part 251 are routed together. Accordingly, the balance of flux linkage can easily be improved by simply changing the routing after the stator 220 is manufactured similarly to the manufacturing method of the first embodiment described above.

The other effects of the second embodiment are similar to those of the first embodiment described above.

Third Embodiment (Structure of Rotating Electrical Machine)

The structure of a rotating electrical machine 300 according to a third embodiment is described with reference to FIG. 10. In the rotating electrical machine 300 according to the third embodiment, slots 323 are open to a radially outer side of a stator core 321 unlike the first and second embodiments described above in which the slots 23 are open to the center side of the stator core 21.

Figure 10:
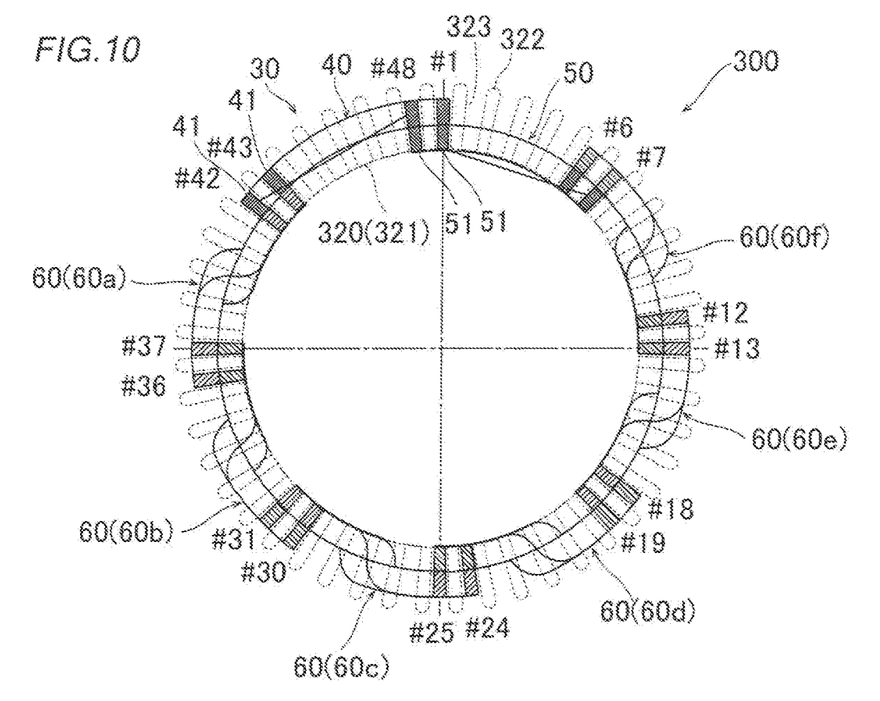
FIG. 10 is a plan view of a rotating electrical machine according to a third embodiment of the present disclosure.

As illustrated in FIG. 10, in the rotating electrical machine 300, the slots 323 of a stator 320 (stator core 321) are open to the radially outer side of the stator core 321. The coil 30 including the first coil portion 40, the second coil portion 50, and the third coil portions 60 is structured so as to be attached to the slots 323 from the radially outer side toward a center side of the stator core 321.

The arrangement of the first coil portion 40, the second coil portion 50, and the third coil portions 60 in the stator core 321 is similar to that of the first embodiment described above.

The other structures of the third embodiment are similar to those of the first embodiment described above.

(Effects of Structure of Third Embodiment)

In the third embodiment, the following effects can be attained.

In the third embodiment, as illustrated in FIG. 10, the slots 323 are open to the radially outer side of the stator core 321, and the coil 30 including the first coil portion 40, the second coil portion 50, and the third coil portions 60 is structured so as to be attached to the slots 323 from the radially outer side toward the center side of the stator core 321. Accordingly, the arrangement of the coil 30 in the slots 323 can be mechanized (automated) easily also in the rotating electrical machine 300 in which the slots 323 are open to the radially outer side of the stator core 321.

(Method for Manufacturing Stator)

Next, a method for manufacturing the stator 320 of the rotating electrical machine 300 is described with reference to FIG. 11.

Preparation of the first coil portion 40, the second coil portion 50, and the third coil portions 60 is similar to that of the first embodiment described above.

Figure 11:
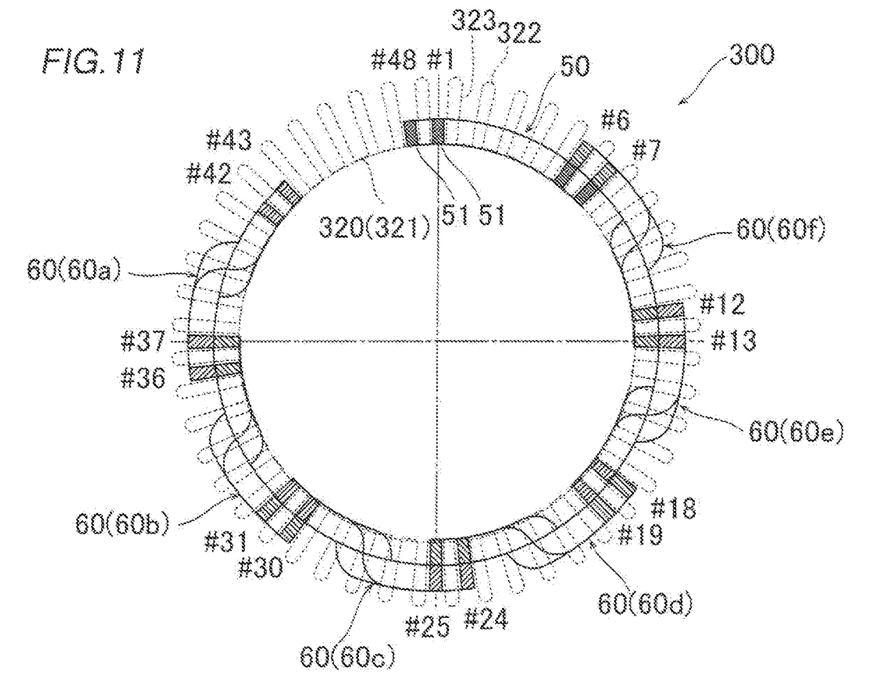
FIG. 11 is a view for describing a method for manufacturing the rotating electrical machine according to the third embodiment of the present disclosure.

As illustrated in FIG. 11, the second coil portion 50 is arranged in the slots 323 of the stator core 321 from the radially outer side toward the center side of the stator core 321 so that the pair of second slot-housed portions 51 are respectively arranged on inner sides of the slots 323 with slot numbers #1 and #48 in the radial direction and on inner sides of the slots 323 with slot numbers #6 and #7 in the radial direction.

Next, the third coil portions 60f to 60a are arranged in this order in the slots 323 of the stator core 321 from the radially outer side toward the center side of the stator core 321.

Next, as illustrated in FIG. 10, the first coil portion 40 is arranged in the slots 323 of the stator core 321 from the radially outer side toward the center side of the stator core 21 so that the pair of first slot-housed portions 41 are respectively arranged on outer sides of the slots 323 with slot numbers #1 and #48 in the radial direction and on outer sides of the slots 323 with slot numbers #42 and #43 in the radial direction.

The other manufacturing methods and effects of the stator 320 of the third embodiment are similar to those of the first embodiment described above.

Fourth Embodiment (Structure of Rotating Electrical Machine)

Figure 12:
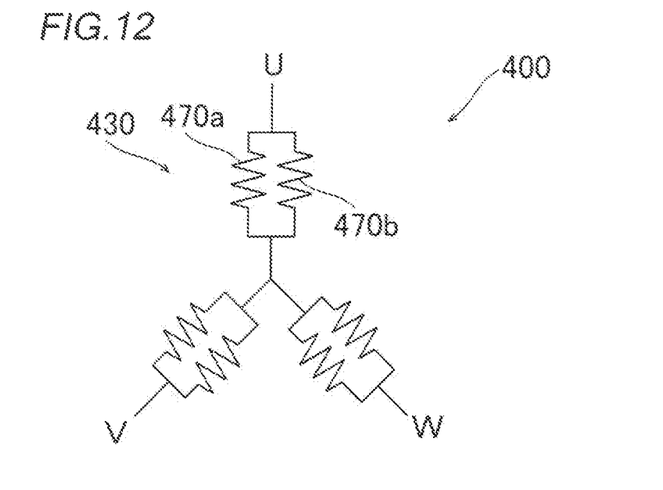
FIG. 12 is a circuit diagram of a rotating electrical machine according to a fourth embodiment of the present disclosure.
Figure 13:
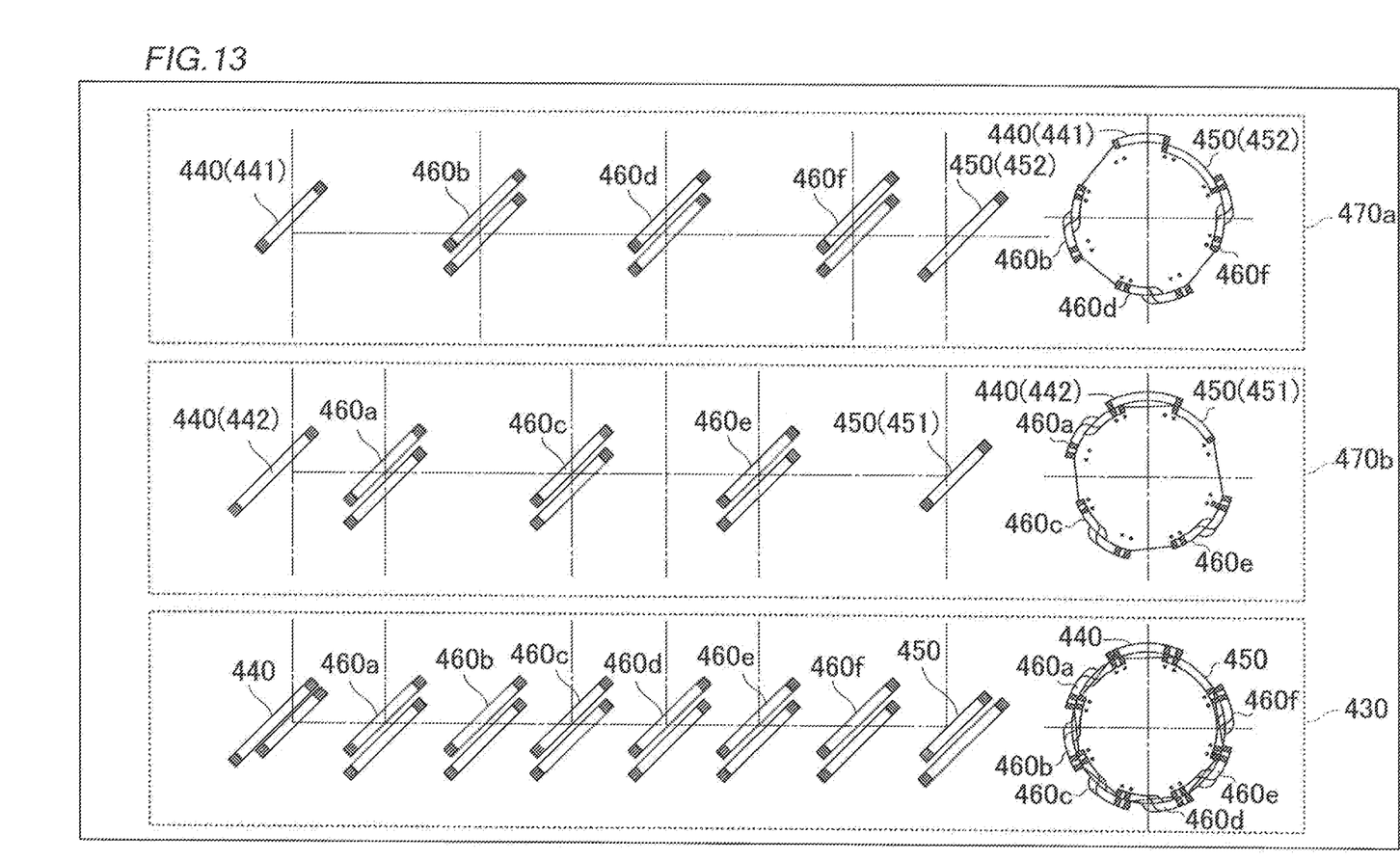
FIG. 13 is a diagram for describing a coil of the rotating electrical machine according to the fourth embodiment of the present disclosure.

The structure of a rotating electrical machine 400 according to a fourth embodiment is described with reference to FIG. 12 and FIG. 13. In the rotating electrical machine 400 according to the fourth embodiment, one phase of two-parallel star connection (see FIG. 12) is structured by a first coil portion 440, a second coil portion 450, and third coil portions 460 unlike the first embodiment described above in which the first coil portion 40, the second coil portion 50, and the third coil portions 60 are connected together in series. In FIG. 13, coil portions included in a first group 470a are illustrated at an upper stage, coil portions included in a second group 470b are illustrated at a middle stage, and a state in which the first group 470a and the second group 470b are combined together is illustrated at a lower stage.

The arrangement of the first coil portion 440, the second coil portion 450, and the third coil portions 460 (third coil portions 460a to 460f) of the rotating electrical machine 400 according to the fourth embodiment in a stator core 421 (see FIG. 1) is similar to that of the first embodiment described above (see FIG. 2). Note that each of the third coil portions 460a and 460f is an example of the "third coil portion."

In the fourth embodiment, as illustrated in FIG. 13, a coil 430 includes the first group 470a in which a first inner coil part 441, the third coil portions 460b, 460d, and 460f, and a second outer coil part 452 are connected together in series. Furthermore, the coil 430 includes the second group 470b in which a first outer coil part 442, the third coil portions 460 that are not included in the first group 470a (third coil portions 460a, 460c, and 460e), and a second inner coil part 451 are connected together in series. As illustrated in FIG. 12, the first group 470a and the second group 470b are connected together in parallel. Coils 430 of the other phases are structured similarly, and two-parallel star connection is structured. Note that the coil 430 is an example of the "stator coil."

The other structures of the fourth embodiment are similar to those of the first embodiment described above.

(Effects of Structure of Fourth Embodiment)

In the fourth embodiment, the following effects can be attained.

In the fourth embodiment, as illustrated in FIG. 13, the coil 430 is structured so as to include the first group 470a in which the first inner coil part 441, the third coil portions 460b, 460d, and 460f, and the second outer coil part 452 are connected together in series, and the second group 470b in which the first outer coil part 442, the third coil portions 460 that are not included in the first group 470a, and the second inner coil part 451 are connected together in series. The first group 470a and the second group 470b are connected together in parallel. Accordingly, the balance of flux linkage can be improved in the first group 470a (in the second group 470b) without changing the routing of the single-layer lap winding coil as in the second embodiment described above.

Modified Examples

It should be understood that the embodiments disclosed herein are illustrative but are not limitative in all respects.

333For example, in the first to fourth embodiments described above, description is given of the example in which one first coil portion and one second coil portion each formed of the single-layer lap winding coil are provided. However, the present disclosure is not limited thereto. For example, a plurality of first coil portions and a plurality of second coil portions may be provided.

In the first to fourth embodiments described above, description is given of the example in which the plurality of third coil portions formed of the double-layer lap winding coils are provided. However, the present disclosure is not limited thereto. For example, one third coil portion may be provided alone.

In the first to fourth embodiments described above, description is given of the example in which each of the first coil portion and the second coil portion includes the inner coil part and the outer coil part and the third coil portion includes the coil parts arranged on one side and the other side in the circumferential direction (that is, each of the first coil portion, the second coil portion, and the third coil portion is formed of a dual coil having two coil parts provided in a row). However, the present disclosure is not limited thereto. For example, each of the first coil portion, the second coil portion, and the third coil portion may be structured by one coil part.

In the first to fourth embodiments described above, description is given of the example in which the end wires of the first coil portion, the end wires of the second coil portion, and the end wires of the third coil portions are structured so as to be routed together after the first coil portion, the second coil portion, the third coil portions are arranged in the slots. However, the present disclosure is not limited thereto. For example, the first coil portion, the second coil portion, and the third coil portions may be arranged in the slots in a state in which the end wires of the first coil portion, the end wires of the second coil portion, and the end wires of the third coil portions are routed together.

In the first to fourth embodiments described above, description is given of the example in which the first coil portion, the second coil portion, and the third coil portions are arranged one by one in the stator core. However, the present disclosure is not limited thereto. For example, the first coil portion, the second coil portion, and the third coil portions may simultaneously be arranged in the stator core.

In the first to fourth embodiments described above, description is given of the example in which the stator core is provided with 48 slots. However, the present disclosure is not limited thereto. In the present disclosure, the stator core may be provided with any number of slots other than 48.

In the first to fourth embodiments described above, description is given of the example in which each of the first coil portion and the second coil portion includes the inner coil part and the outer coil part. However, the present disclosure is not limited thereto. For example, each of the first coil portion and the second coil portion may have a structure in which coils of single-layer lap winding (wound only once) in the same shape are arranged in the slots while being offset in the circumferential direction.

The invention claimed is:

1. A stator coil that is a coil arranged in a stator core, the stator coil comprising:
 a first coil portion including a pair of first slot-housed portions respectively arranged on an outer side of a first slot of the stator core in a radial direction and on an outer side of a second slot of the stator core in the radial direction;

a second coil portion including a pair of second slot-housed portions respectively arranged on an inner side of the first slot in the radial direction and on an inner side of a third slot in the radial direction, the third slot being arranged across the first slot from the second slot in a circumferential direction; and
a third coil portion including a pair of third slot-housed portions respectively arranged on an inner side and on an outer side in the radial direction, one of the third slot-housed portions being arranged on either of an inner side of the second slot in the radial direction and an outer side of the third slot in the radial direction.

2. The stator coil according to claim 1, wherein coil portions of the stator coil other than the first coil portion and the second coil portion are structured by coil portions including the third coil portion, each of which includes a pair of slot-housed portions respectively arranged on an inner side and on an outer side in the radial direction.

3. The stator coil according to claim 2, wherein a plurality of the third coil portions are provided, and one third slot-housed portion of one third coil portion out of the plurality of the third coil portions is arranged on the inner side of the second slot in the radial direction, and one of the third slot-housed portion of another third coil portion out of the plurality of the third coil portions is arranged on the outer side of the third slot in the radial direction.

4. The stator coil according to claim 3, wherein the first coil portion includes a first inner coil part wound on an inner side, and a first outer coil part wound on an outer side of the first inner coil part,
the second coil portion includes a second inner coil part wound on an inner side, and a second outer coil part wound on an outer side of the second inner coil part, and
the first inner coil part and the second outer coil part are routed together, and the first outer coil part and the second inner coil part are routed together.

5. The stator coil according to claim 3, wherein the first coil portion includes a first inner coil part wound on an inner side, and a first outer coil part wound on an outer side of the first inner coil part,
the second coil portion includes a second inner coil part wound on an inner side, and a second outer coil part wound on an outer side of the second inner coil part, and
the first inner coil part and the first outer coil part are routed together, and the second inner coil part and the second outer coil part are routed together.

6. The stator coil according to claim 4, wherein a plurality of the third coil portions are provided, the stator coil includes:
a first group in which the first inner coil part, the third coil portion, and the second outer coil part are connected together in series; and
a second group in which the first outer coil part, the third coil portion that is not included in the first group, and the second inner coil part are connected together in series, and
the first group and the second group are connected together in parallel.

7. The stator coil according to claim 6, wherein end wires of the first coil portion, end wires of the second coil portion, and end wires of the third coil portion are structured so as to be routed together after the first coil portion, the second coil portion, and the third coil portion are arranged in slots.

8. The stator coil according to claim 7, wherein slots are open to a center side of the stator core, and the stator coil including the first coil portion, the second coil portion, and the third coil portion is structured so as to be attached to the slots from the center side toward a radially outer side of the stator core.

9. The stator coil according to claim 7, wherein slots are open to a radially outer side of the stator core, and
the stator coil including the first coil portion, the second coil portion, and the third coil portion is structured so as to be attached to the slots from the radially outer side toward a center side of the stator core.

10. A method for manufacturing a stator, comprising:
arranging, in a stator core, one of a first coil portion including a pair of first slot-housed portions to be respectively arranged on an outer side of a first slot of the stator core in a radial direction and on an outer side of a second slot of the stator core in the radial direction and a second coil portion including a pair of second slot-housed portions to be respectively arranged on an inner side of the first slot in the radial direction and on an inner side of a third slot in the radial direction, the third slot being arranged across the first slot from the second slot in a circumferential direction;
arranging, in the stator core, a third coil portion including a pair of third slot-housed portions to be respectively arranged on an inner side and on an outer side in the radial direction, one of the third slot-housed portions being arranged on either of an inner side of the second slot in the radial direction and an outer side of the third slot in the radial direction; and
arranging, in the stator core, the other of the first coil portion and the second coil portion.

11. The method for manufacturing a stator according to claim 10, wherein arranging the first coil portion, the second coil portion, and the third coil portion in the stator core include arranging the first coil portion, the second coil portion, and the third coil portion one by one in the stator core.

12. The method for manufacturing a stator according to claim 11, wherein
the first coil portion includes a first inner coil part wound on an inner side, and a first outer coil part wound on an outer side of the first inner coil part,
the second coil portion includes a second inner coil part wound on an inner side, and a second outer coil part wound on an outer side of the second inner coil part, and
the method further includes routing the first inner coil part and the second outer coil part together and routing the first outer coil part and the second inner coil part together after the first coil portion, the second coil portion, and the third coil portion are arranged in the stator core.

13. A rotating electrical machine, comprising:
a rotor core provided with a permanent magnet;
a stator core arranged so as to face the rotor core in a radial direction; and
a coil arranged in the stator core, wherein the coil includes:
a first coil portion including a pair of first slot-housed portions respectively arranged on an outer side of a first slot of the stator core in the radial direction and on an outer side of a second slot of the stator core in the radial direction;

a second coil portion including a pair of second slot-housed portions respectively arranged on an inner side of the first slot in the radial direction and on an inner side of a third slot in the radial direction, the third slot being arranged across the first slot from the second slot in a circumferential direction; and a third coil portion including a pair of third slot-housed portions respectively arranged on an inner side and on an outer side in the radial direction, one of the third slot-housed portions being arranged on either of an inner side of the second slot in the radial direction and an outer side of the third slot in the radial direction.

* * * * *